United States Patent
Gowda et al.

(10) Patent No.: US 11,847,027 B2
(45) Date of Patent: Dec. 19, 2023

(54) AUTOMATED CONFIGURATION CONFLICT RESOLUTION AND LIGHTWEIGHT RESTORATION

(71) Applicant: Microsoft Technology Licensing, LLC, Redmond, WA (US)

(72) Inventors: Kantha Vishwas Gowda, Bangalore (IN); Sumit Maheshwari, Westford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/695,374

(22) Filed: Mar. 15, 2022

(65) Prior Publication Data
US 2023/0297475 A1    Sep. 21, 2023

(51) Int. Cl.
*G06F 11/00* (2006.01)
*G06F 11/14* (2006.01)

(52) U.S. Cl.
CPC ........ *G06F 11/142* (2013.01); *G06F 11/1464* (2013.01); *G06F 11/1484* (2013.01)

(58) Field of Classification Search
CPC ............... G06F 11/142; G06F 11/1464; G06F 11/1484; G06F 11/0712; G06F 11/0709; G06F 11/1402; G06F 11/26; G06F 11/301; G06F 11/3006
See application file for complete search history.

(56) References Cited

U.S. PATENT DOCUMENTS

| | | | |
|---|---|---|---|
| 5,712,971 A | 1/1998 | Stanfill et al. | |
| 8,291,261 B2 | 10/2012 | Malleck et al. | |
| 9,043,391 B2 | 5/2015 | Husain et al. | |
| 10,797,952 B1 * | 10/2020 | Mills | H04L 41/0859 |
| 10,891,140 B1 * | 1/2021 | Levin | G06F 9/45533 |
| 11,237,821 B1 | 2/2022 | Hoeft et al. | |

(Continued)

OTHER PUBLICATIONS

"Configuration Replace and Configuration Rollback", Retrieved from: https://www.cisco.com/en/US/docs/switches/lan/catalyst3850/software/release/3se/consolidated_guide/b_consolidated_3850_3se_cg_chapter_010000000.pdf, Retrieved Date: Jan. 14, 2022, 18 Pages.

(Continued)

*Primary Examiner* — Joseph D Manoskey
(74) *Attorney, Agent, or Firm* — Mark K. Young; Mark Young PC

(57) ABSTRACT

An automated toolset performs configuration conflict resolution for virtual machines (VMs) providing services in a networked cloud computing system by determining a set of changes to be committed through a series of automated actions. The toolset resolves conflicts among multiple possible configurations that could result in an incorrect VM state and merges configurations in view of inputs from internal and external systems. The toolset operates to identify only a subset of changes that differ between current and new configurations that are loaded into the system to streamline configuration loading and provide for lightweight restoration by rolling back only those differences. Further efficiencies are achieved using an automated test suite environment that is specially adapted to test and validate new configurations to ensure correct loading and avoid system failures.

18 Claims, 15 Drawing Sheets

(56) References Cited

U.S. PATENT DOCUMENTS

| | | | |
|---|---|---|---|
| 2014/0258479 A1* | 9/2014 | Tenginakai | H04L 41/0889 |
| | | | 709/220 |
| 2019/0220359 A1 | 7/2019 | Srinivasan et al. | |
| 2020/0162462 A1* | 5/2020 | Zayats | H04L 41/082 |
| 2022/0321406 A1* | 10/2022 | Nelson | H04L 41/50 |

OTHER PUBLICATIONS

"Configuration Replace and Configuration Rollback", Retrieved from: https://www.cisco.com/en/US/docs/switches/lan/catalyst3850/software/release/3se/consolidated_guide/b_consolidated_3850_3se_cg_chapter_010000000.html, Retrieved Date: Jan. 14, 2022, 9 Pages.

"CloudVision Configuration Guide", Retrieved From: https://usermanual.wiki/m/e208e11ab5573702dc4a438a70235f10b388c5616893d083e02344cb682399d4c.pdf, Feb. 2021, 388 Pages.

"International Search Report and Written Opinion Issued in PCT Application No. PCT/US22/053901", dated Apr. 19, 2023, 13 Pages.

\* cited by examiner

1100

AUTOMATED CONFIGURATION CONFLICT RESOLUTION AND LIGHTWEIGHT RESTORATION

BACKGROUND

A cloud computing environment, also called a "cloud computing network," "distributed computing system," or simply a "cloud," typically provides processing and storage resources on demand from virtual machines over a communication network. The resources provided by the cloud computing network are generally available on demand from shared pools of configurable computing resources such as networks, servers, storage devices, applications, and software services, and the offered resources can typically be rapidly provisioned and released with relatively small management effort from the users. Services from cloud computing networks for compute, networking, and storage give users varied and flexible capabilities to store, communicate, and process their data in third-party datacenters.

A virtual machine is typically configured using commands that are loaded to place it into a suitable operating state by maintaining, upgrading, or modifying various computing system parameters. Configurations may be provided by both internal and external sources and multiple different, but conflicting configurations are thus possible for a given virtual machine which can lead to system failures. Resolving configuration conflicts and restoring the computing system back to an original working state can be costly and time-consuming using traditional methods which commonly require system rebooting.

SUMMARY

An automated configuration validation and testing system performs configuration conflict resolution for virtual machines (VMs) providing services in a networked cloud computing system by determining a set of changes to be committed through a series of automated actions. The system resolves conflicts among multiple possible configurations that could result in an incorrect VM state and merges configurations in view of inputs from internal and external systems. The system operates to identify only a subset of changes that differ between current and new configurations that are loaded into the system to streamline configuration loading and provides for lightweight restoration by rolling back only those differences. Further efficiencies are achieved using an automated test suite environment that is specially adapted to test and validate new configurations to ensure correct loading and avoid system failures.

In an illustrative embodiment, a dynamic match ordering methodology is utilized to provide fast configuration conflict resolution using a database that organizes configuration options or components as nodes in a tree structure providing a relationship graph with dependencies. Each configuration is divided into smaller configurations called "minors" that can be atomically applied, and which are bucketed by category. A minor match order may be skipped or reordered based on the dependencies in the relationship graph and a dynamic match order priority is assigned to each minor. Conflict types are determined for each category for the first minor and rejected minors and dependents are discarded. The processing is repeated for all the minors which are joined to create a complete configuration for each category with a commit order. All of the categories are joined to create a complete configuration.

Advantageously, the automated configuration validation and testing system provides for technical improvements in VM configuration management. The improvements are particularly beneficial in usage scenarios in which VMs may be deployed in clusters having multiple VMs with each potentially running multiple different configurations. Configuration changes requested by customers or other internal/external entities may be incorrect, include overlapping and/or conflicting requirements, or expose a VM to the vulnerability that configurations are loaded in an incorrect order. The automated toolset's implementation of a test suite environment reduces time-consuming manual interventions needed to load VM configurations while improving the accuracy for validating and merging configurations based on multiple input parameters such as priority and timestamp.

The automated configuration validation and testing system further provides technical improvements in restoring system state to an original configuration using the identified subset of changes between configurations that enables lightweight restoration. Rather than having to clear and reset a current configuration by rolling back configuration commands step-by-step as with conventional methods, lightweight restoration is faster and easier to implement without the need for system rebooting. In addition, a VM cluster's resources and active time are not utilized which thus prevents service loss during configuration changes and restoration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
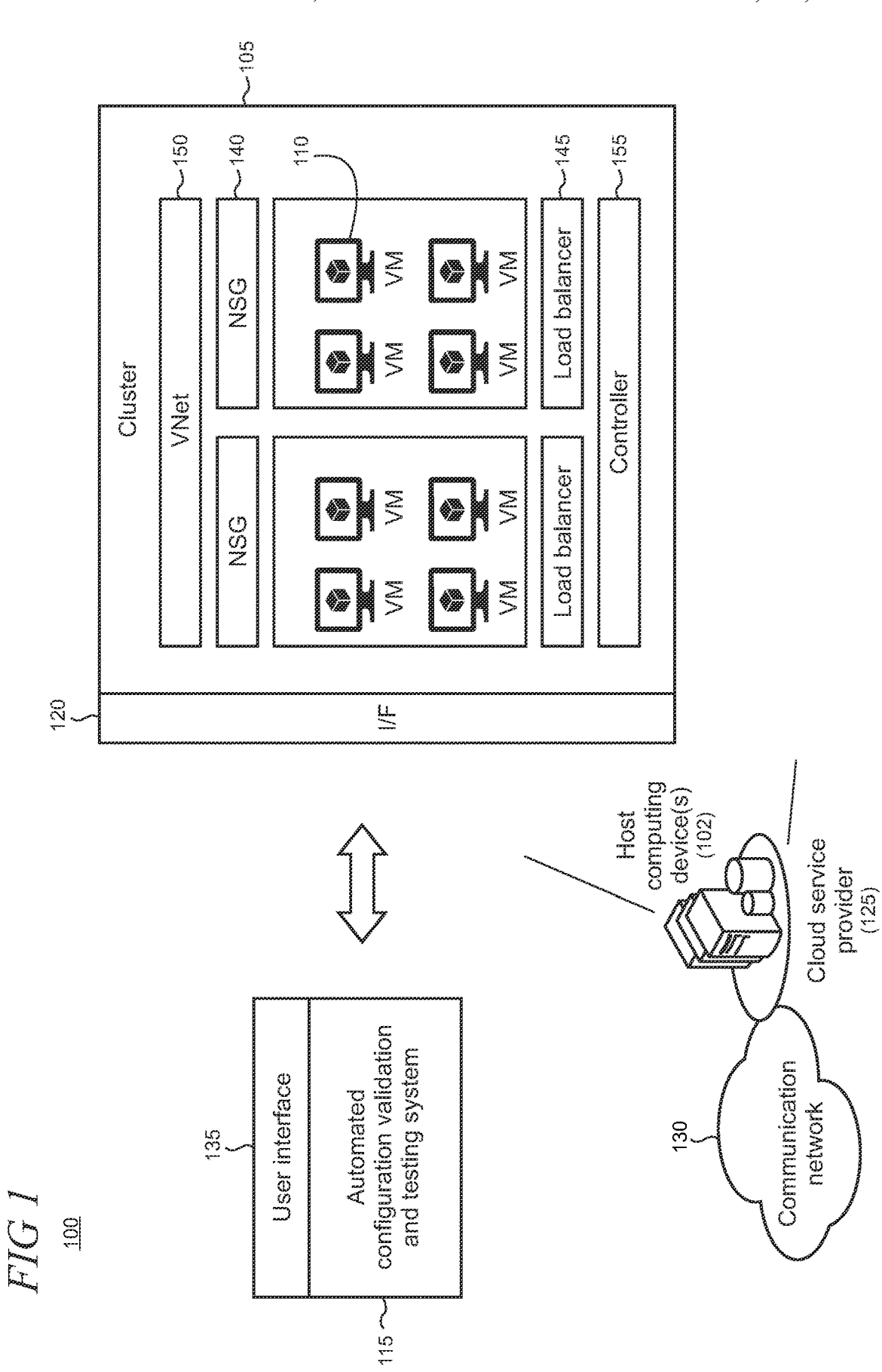
FIG. 1 shows an illustrative cloud computing environment in which a host computing device supports a cluster of virtual machines (VMs) that is configured to interoperate with an automated configuration validation and testing system.

FIG. 1 shows an illustrative cloud computing environment 100 in which one or more host computing devices 102 support a cluster 105 of virtual machines (VMs), representatively indicated by reference numeral 110, that is configured to interoperate with an automated configuration validation and testing system 115 over a suitable interface 120 such as an application programming interface (API). The host computing devices may be operated by a cloud service provider 125, for example as part of a datacenter, to provide various services to customers, partners, or other third parties over a communication network 130.

The automated configuration validation and testing system 115 may be configured to run on one or more computing devices or other infrastructure that is operated by the cloud service provider, an affiliated entity, or third-party. The system 115 is configured to expose a user interface (UI) 135 such as a command line interface (CLI) or graphical user interface (GUI) and may be co-located in a datacenter with the VM cluster or be operated remotely. The UI may be adapted to enable manual intervention and/or control of the testing system in some scenarios as well as be adapted to raise alerts and provide notifications, for example, during system operations.

The VM cluster 105 shown in the drawing is illustrative and cluster architecture can vary by implementation. In this illustrative example, VMs 110 are arranged into one or more network security groups (NSGs), representatively indicated by reference numeral 140. A load balancer may be utilized with each group of VMs, as representatively indicated by reference numeral 145. The VMs may be organized as part of a virtual network (VNet) 150 and operated by a controller 155. It may be appreciated that a VM can comprise containers or other virtualization constructs and that the principles described herein are equally applicable to such containers and constructs and/or other virtualization platforms.

Figure 2:
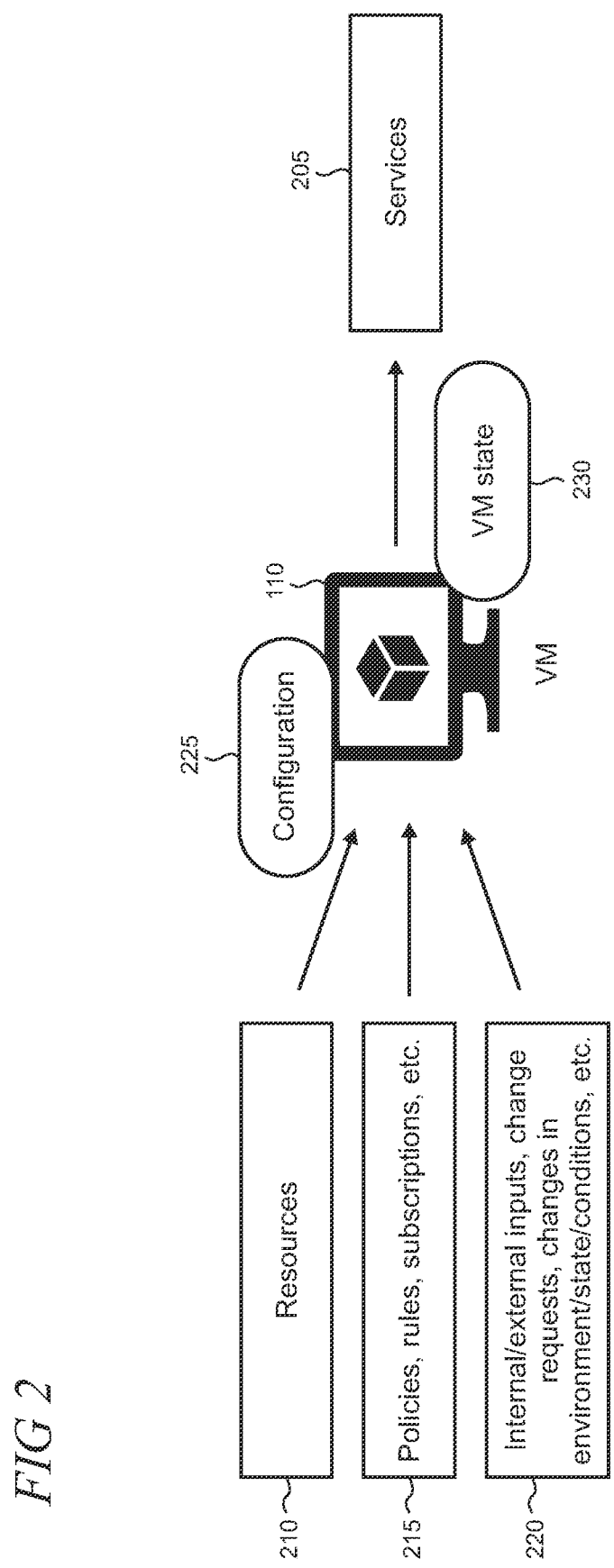
FIG. 2 shows an illustrative VM that is configured to provide services by allocating resources based on various parameters.

FIG. 2 shows an illustrative VM 110 that is configured to provide services 205 by allocating resources 210 in view of, for example, applicable policies, rules, subscriptions, and the like, as indicated by reference numeral 215. The resources may further be allocated based on various other parameters which may include, for example, internal/external inputs, configuration change requests, changes in environment/state/condition, and the like, as indicated by reference numeral 220. The resources in this illustrative example may include system resources such as compute, networking, or storage.

A construct called "configuration" 225 for the VM 110 is utilized herein to refer to a collection of programming steps that are utilized to maintain, upgrade, and/or modify computing system parameters of the VM as appropriate and required to place it into an operating state 230 to meet its design requirements in providing the services 205. Conventionally, a VM configuration is implemented by committing internal or external configurations using a series of steps using a command line interface or other auto-configuration script. Typically, in scenarios where there are more than one suitable configuration available, configuration conflict resolution and validation can result in lengthy wait times before configuration is loaded. A system may also accept an incorrect configuration when multiple configurations are available or accept configurations in an incorrect order. As discussed below, the automated configuration validation and testing system 115 (FIG. 1) provides technical and efficiency improvements compared to conventional configuration management methods.

Figure 3:
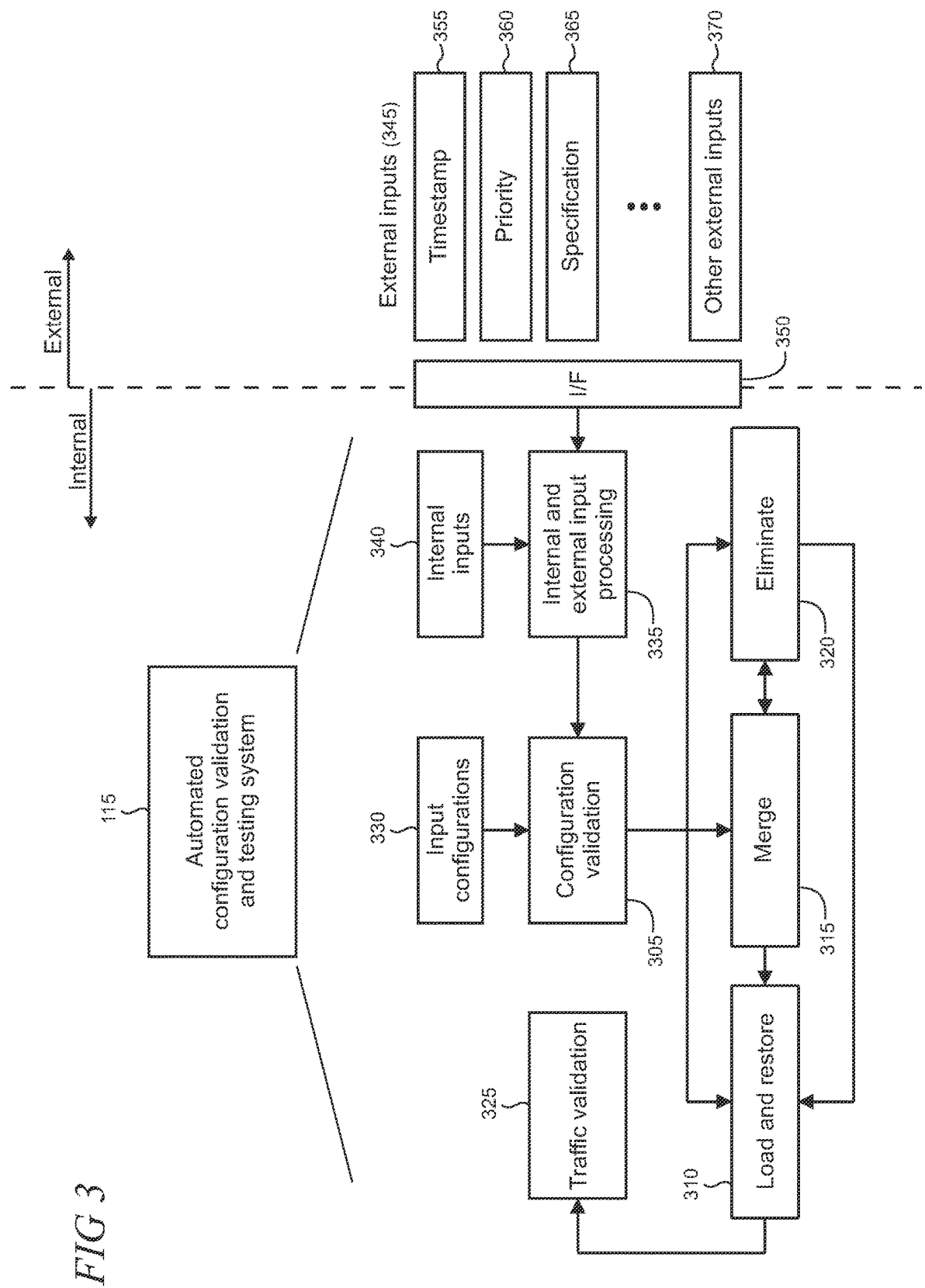
FIG. 3 shows illustrative functional modules of an automated configuration validation and testing system.

FIG. 3 shows illustrative functional modules of the automated configuration validation and testing system 115 that may be utilized to perform configuration conflict resolution and lightweight restoration processes. A configuration validation module 305 interoperates with three modules including load and restore 310, merge 315, and eliminate 320. The load and restore module interoperates with a traffic validation module 325, as shown. These modules and associated processes are discussed in more detail below in the text accompanying FIGS. 5-10.

The configuration validation module 305 is operated responsively to input configurations 330 and inputs from an internal and external input processing module 335. The input processing module 335 interfaces with internal inputs 340 and external inputs 345. For example, the internal inputs may come from sources or entities that are part of or associated with the automated configuration validation and testing system 115 and/or cloud service provider 125 (FIG. 1). The external inputs may be provided via an interface 350, for example, by non-associated entities or third parties. In this illustrative example, external inputs comprise one or more of timestamp 355, priority 360, specification 365, or other suitable external inputs 370.

Figure 4:
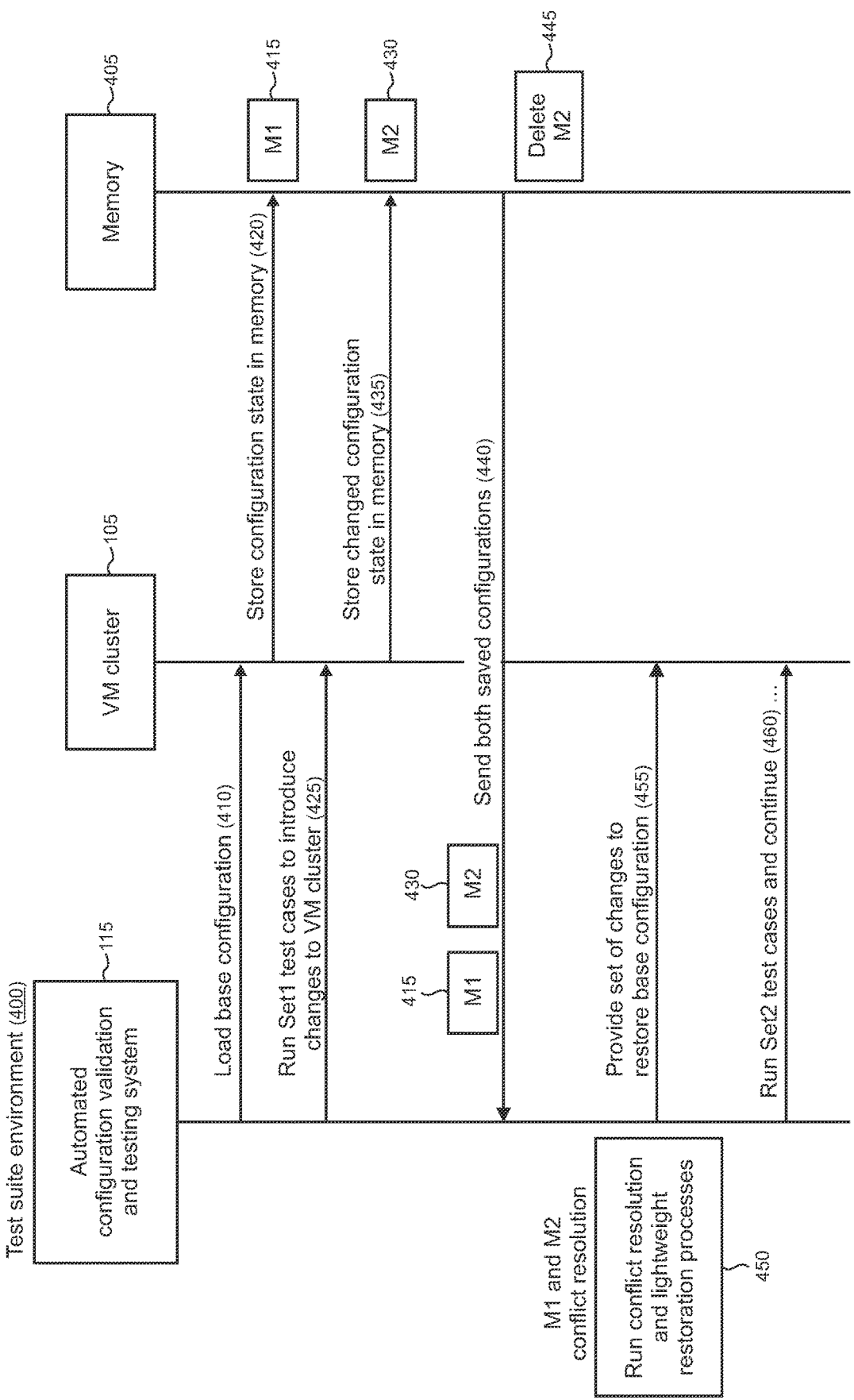
FIG. 4 shows an illustrative timeline in which an automated configuration validation and testing system is operated in a test suite environment to restore VM state between test cases.

FIG. 4 shows an illustrative timeline in which the automated configuration validation and testing system 115 is operated in a test suite environment 400 to restore VM state between test cases using the functional modules shown in FIG. 3. The timeline indicates operations between the automated configuration validation and testing system, the VM cluster 105 and a system memory 405. A testing procedure begins at step 410 in which the automated configuration validation and testing system loads a base configuration into the VM cluster 105. The VM cluster stores this configuration state in a memory portion M1 415 at step 420.

At step 425 the automated configuration validation and testing system 115 runs test cases in a first set for a new configuration, Set1, to introduce changes to the VM cluster 105. The VM cluster stores the changed configuration state in a memory portion M2 430 at step 435. The memory 405 sends both of the saved configurations, the base configuration in memory M1 and the changed configuration in memory M2, to the automated configuration validation and testing system at step 440. The contents of the M2 memory are then deleted at step 445.

At step 450, the automated configuration validation and testing system 115 runs configuration conflict resolution and lightweight restoration processes to resolve conflicts between the respective configurations in the M1 and M2 memories. The results of the processes are a set of changes between the base configuration and the new configuration associated with the Set1 test cases. The set of changes that can be used to roll back the VM cluster state to restore the base configuration is sent to the VM cluster 105 at step 455. The above steps may then be repeated for test cases for another new configuration, Set2, as indicated at step 460. It may be appreciated that the automated configuration validation and testing system can continue to run test cases in a suitable number and manner to meet the needs of a given implementation.

Figure 5:
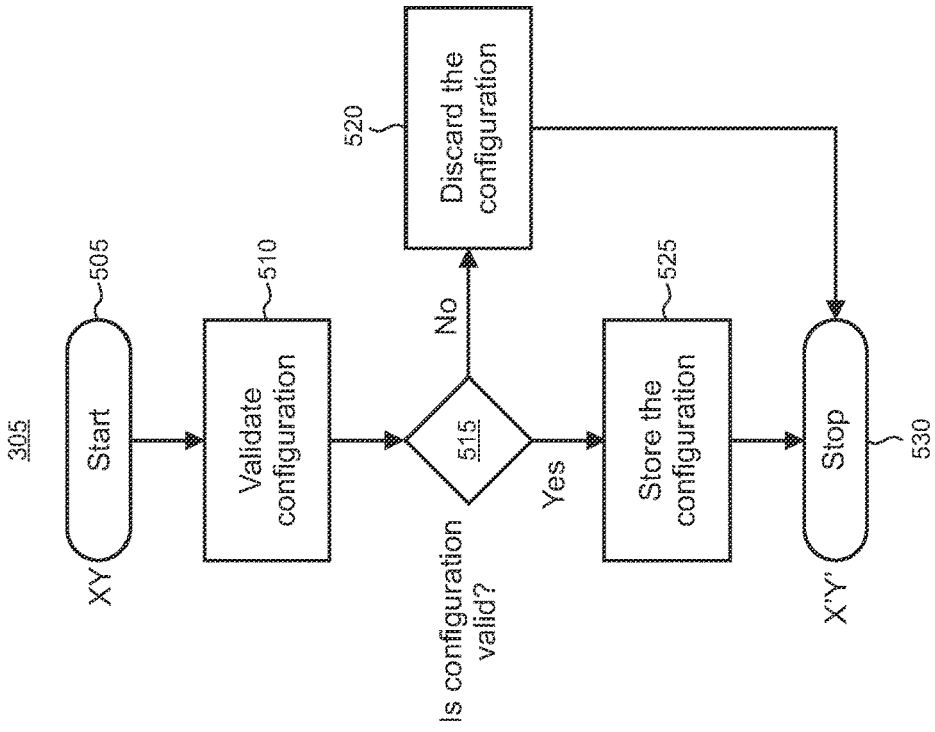
FIG. 5 shows an illustrative flowchart of processing that may be performed by a configuration validation module.

FIG. 5 shows an illustrative flowchart of processing that may be performed by the configuration validation module 305. A configuration comprising configuration options or components "X" and "Y" (collectively referred to as "XY") in this illustrative example is input at start block 505. It is emphasized that the configuration notation used herein is arbitrary and does not necessarily indicate any particular number, arrangement, or types of options that may be instantiated in a given configuration. The configuration validation module accepts internal and external inputs to validate the configuration at block 510. At decision block 515, if the configuration is invalid then it is discarded at block 520. In some cases, a notification may be provided upon discard by the configuration validation module. If the configuration is valid, then it is stored at block 525. The validated configuration is indicated using prime notation, for example X'Y' at stop block 530.

Figure 6:
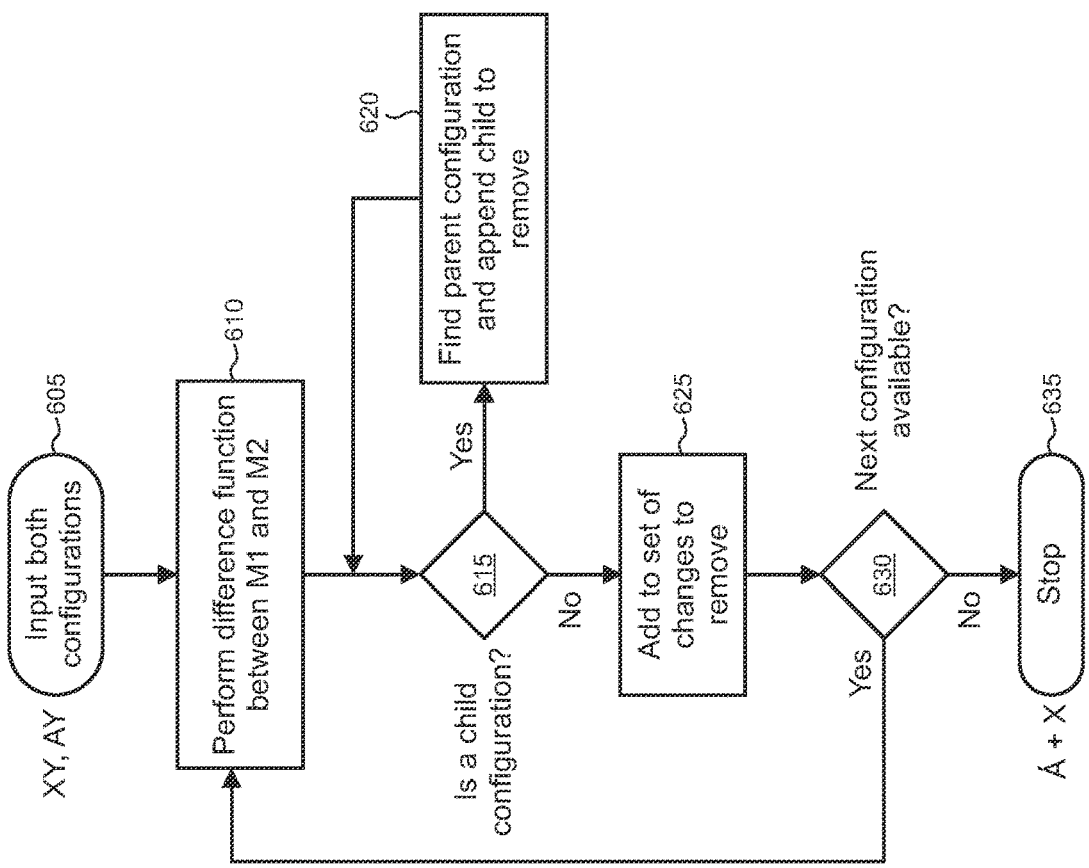
FIG. 6 shows an illustrative flowchart of processing that may be performed by a load and restore module.

FIG. 6 shows an illustrative flowchart of processing that may be performed by the load and restore module 310. Two different configurations, XY and AY, are input to the module at start block 605 from respective memories M1 and M2 (elements 415 and 430 in FIG. 4). At block 610, the load and restore module performs a difference function between the configurations XY and AY. If the result is determined as a child configuration at decision block 615, then a parent configuration is found at block 620 and the child is appended and sent to the VM cluster 105 for removal during lightweight restoration (step 455 in FIG. 4). As used herein and discussed in more detail in the text accompanying FIG. 11, a parent configuration is a configuration in a database that is represented using a tree structure in which the parent is a predecessor of one or more other configurations. A child configuration is one that is farther from the root configuration in the tree structure, and which is related to the parent configuration.

Continuing with the description of FIG. 6, if the result of the difference function is not a child configuration, then at block 625 the changes between the base (i.e., M1) and new configuration (i.e., M2) are added to a set of changes that are sent to the VM cluster for removal during lightweight restoration. At decision block 630, if a next configuration is available for processing (e.g., Set3 test cases), then the process repeats at block 610. Otherwise, the process terminates at stop block 635. Here, an acute diacritic notation is utilized, A, to indicate that the A component of the new configuration comprises a change that is removed at lightweight restoration to roll back to the base configuration.

Figure 7:
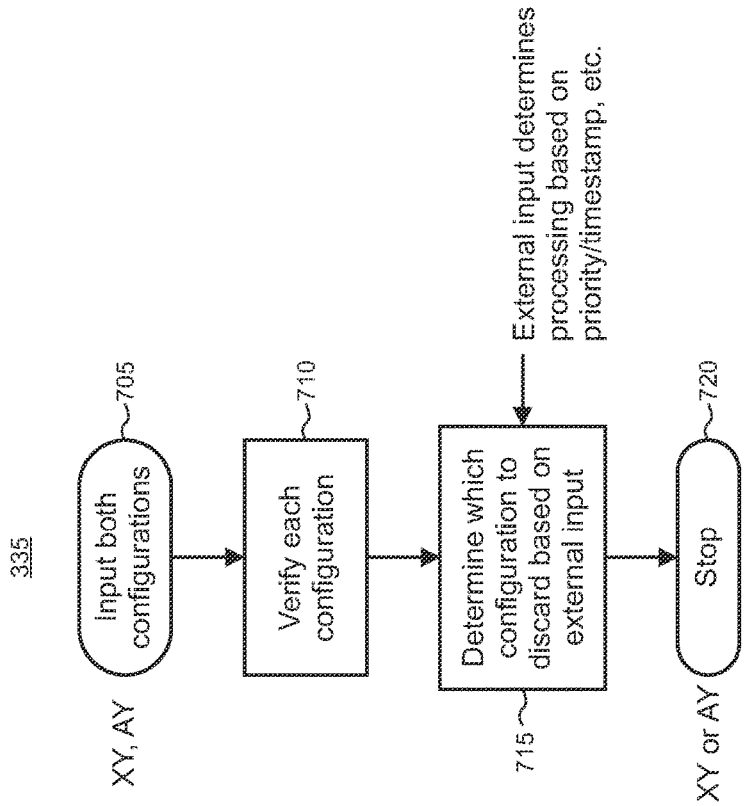
FIG. 7 shows an illustrative flowchart of processing that may be performed by an internal and external input processing module.

FIG. 7 shows an illustrative flowchart of processing that may be performed by the internal and external input processing module 335. Two different configurations, XY and AY, are input to the module at start block 705 from respective memories M1 and M2 (elements 415 and 430 in FIG. 4). The module verifies each configuration at block 710. At block 715, the internal and external input processing module determines which configuration to discard based on external inputs 345 (FIG. 3). Accordingly, the post-processed configuration can include XY or AY in this example as shown at stop block 720.

Figure 8:
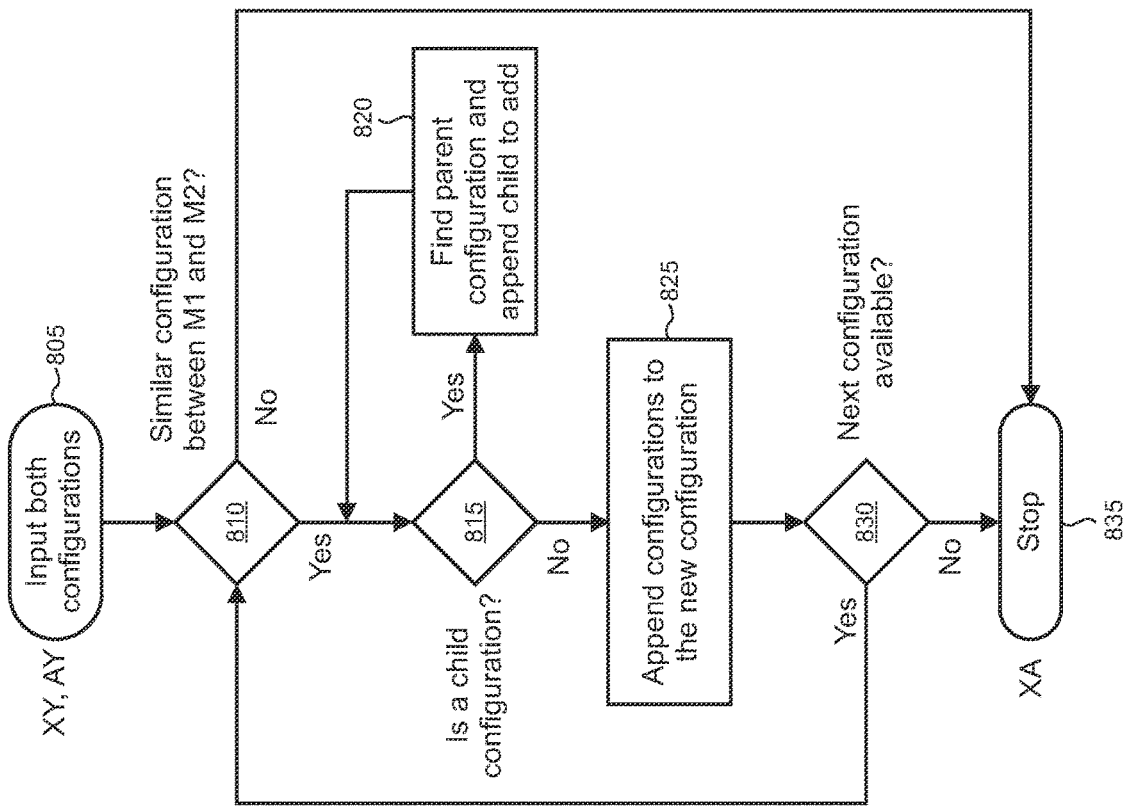
FIG. 8 shows an illustrative flowchart of processing that may be performed by an eliminate module.

FIG. 8 shows an illustrative flowchart of processing that may be performed by the eliminate module 320 to remove overlaps among configurations to thereby eliminate common configuration. Two different configurations, XY and AY, are input to the module at start block 805 from respective memories M1 and M2 (elements 415 and 430 in FIG. 4). At decision block 810, if the configurations in M1 and M2 are dissimilar, then the process stops at block 835 with a configuration of XA where the overlapping Y component is eliminated. If the configurations in M1 and M2 are similar, then at decision block 815, if a child configuration, then the parent is found at block 820 and the child is appended and sent to the VM cluster to be added during lightweight restoration.

If not a child configuration at block 815, then at block 825 the configurations are appended to the new configuration. If a next configuration is available for processing at decision block 830, then the process is repeated at decision block 810. Otherwise, the process terminates at stop block 835.

Figure 9:
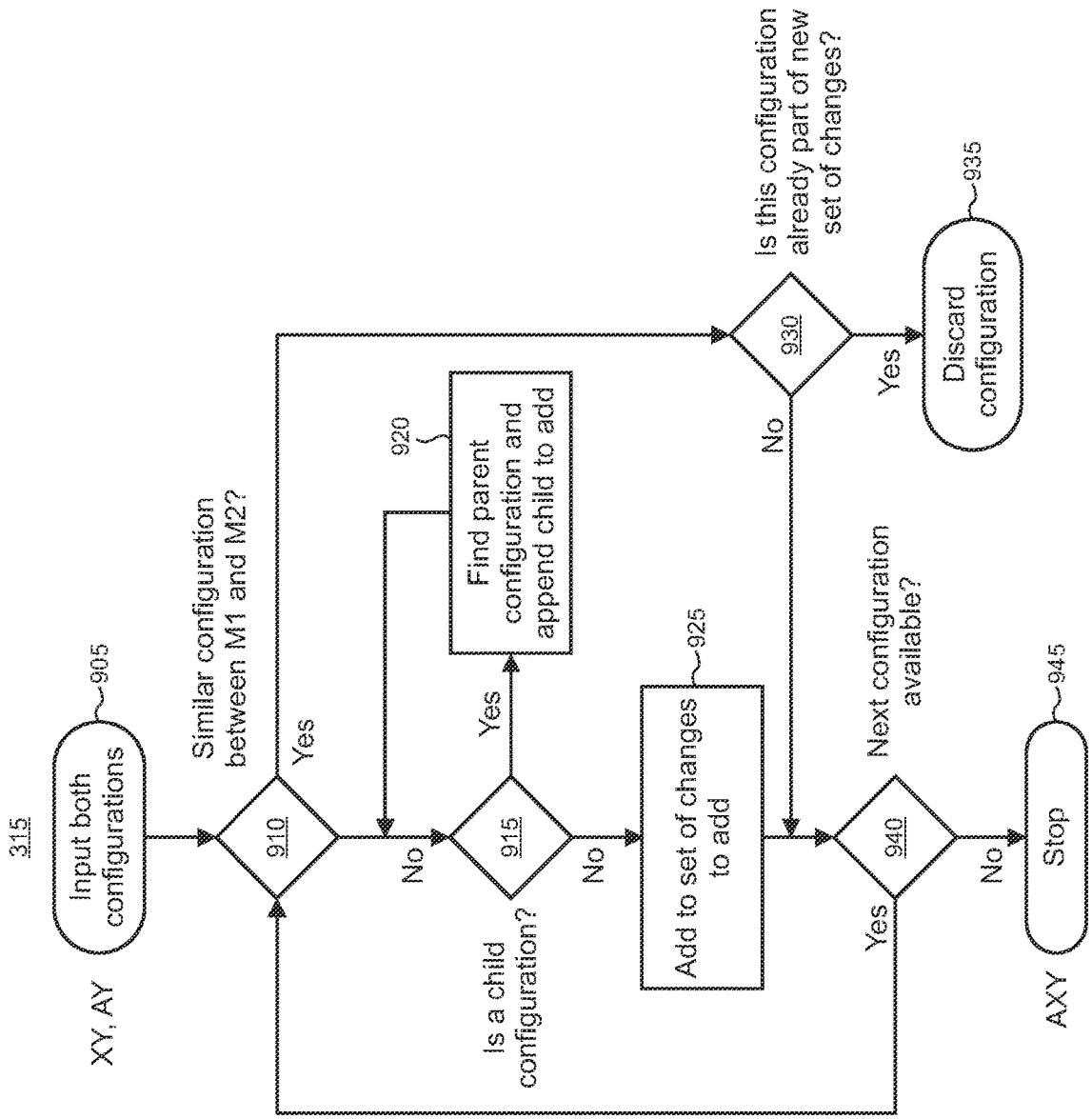
FIG. 9 shows an illustrative flowchart of processing that may be performed by a merge module.

FIG. 9 shows an illustrative flowchart of processing that may be performed by the merge module 315 to converge all input configurations into one complete set while also removing the common configurations between the inputs. Two different configurations, XY and AY, are input to the module at start block 905 from respective memories M1 and M2 (elements 415 and 430 in FIG. 4). At decision block 910, if the configurations in M1 and M2 are similar, then control is passed to decision block 930. If the configuration is already part of a new set of changes, then the configuration is discarded at block 935. Otherwise, control is passed to decision block 940. Control is passed back to decision block 910 if a next configuration is available for processing. If not, the process terminates at stop block 945.

Returning to the process flow at decision block 910, if there is not a similar configuration between the configuration in M1 and M2, then at block 915, if a child configuration, then at block 920 the parent configuration is found, and the child is appended and sent to the VM cluster to be added during lightweight restoration. If not a child configuration, then the changes between the base configuration (i.e., M1) and the new configuration (i.e., M2) are added to a set of changes that are sent to the VM cluster to be added during lightweight restoration at block 925. If a next configuration is available for processing, then control passes back to decision block 910 and the process repeats. Otherwise, the process terminates at stop block 945. As shown, the merged configuration is AXY as the common configuration Y between the inputs is removed.

Figure 10:
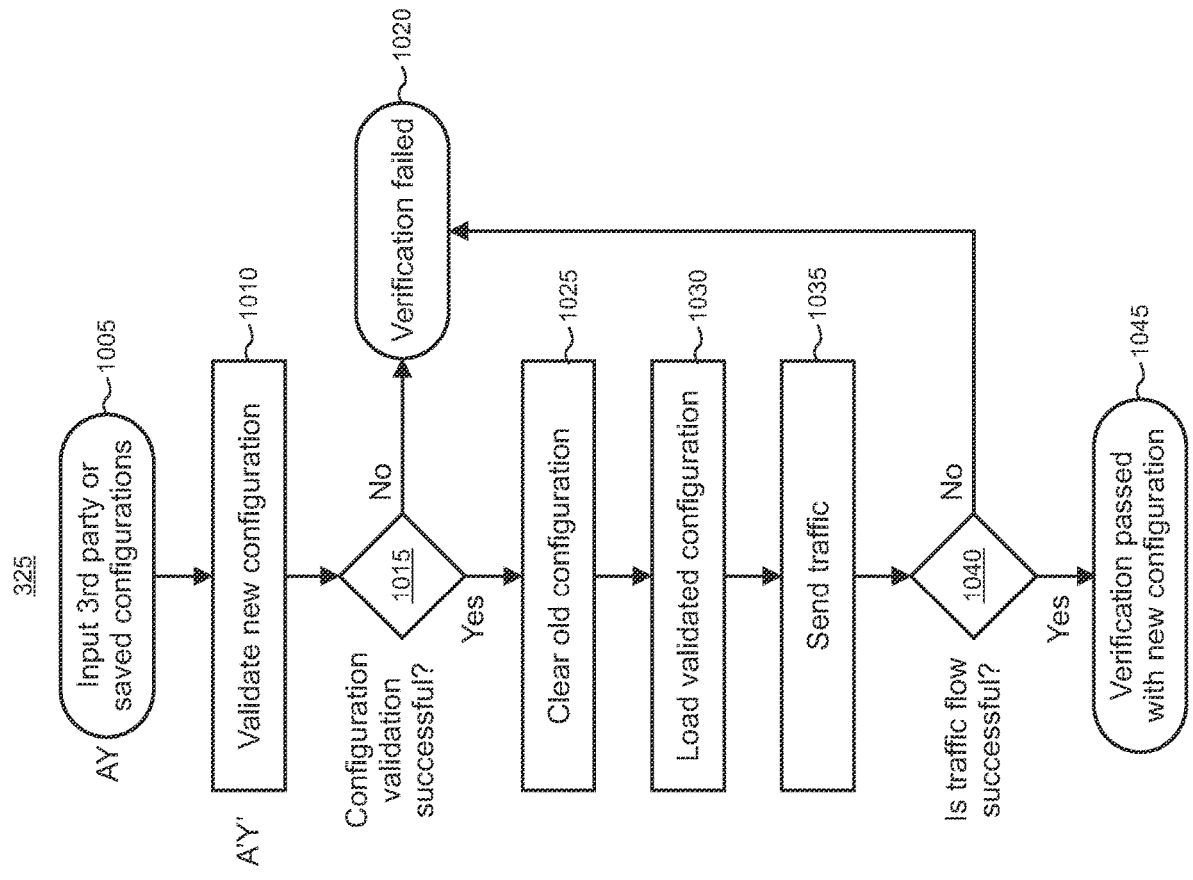
FIG. 10 shows an illustrative flowchart of processing that may be performed by a traffic validation module.

FIG. 10 shows an illustrative flowchart of processing that may be performed by the traffic validation module 325. The module is arranged to validate a new set of changes and restore the changes by applying them to a device under test (DUT) in the test suite environment 400 (FIG. 4). In addition, the module may be adapted to automatically set up a call for sending or receiving traffic at a VM to validate a configuration.

A configuration A'Y' that represents a saved configuration or one that is provided by a third party is input to the traffic validation module 325 at start block 1005. The module validates the new configuration at block 1010 in which A'Y' represents the validated configuration. At decision block 1015, if the configuration validation is not successful then verification is considered failed at block 1020. If the configuration validation is successful, then the old configuration is cleared at block 1025. The validated configuration A'Y' is loaded at block 1030. The module can make a call to the VM cluster and send traffic to test the configuration at block 1035. If the traffic flow is successful at decision block 1040, the verification of the new configuration is considered passed and the process ends at block 1045. Otherwise, if the traffic flow is unsuccessful, then the configuration verification is deemed as failed at block 1020.

Figure 11:
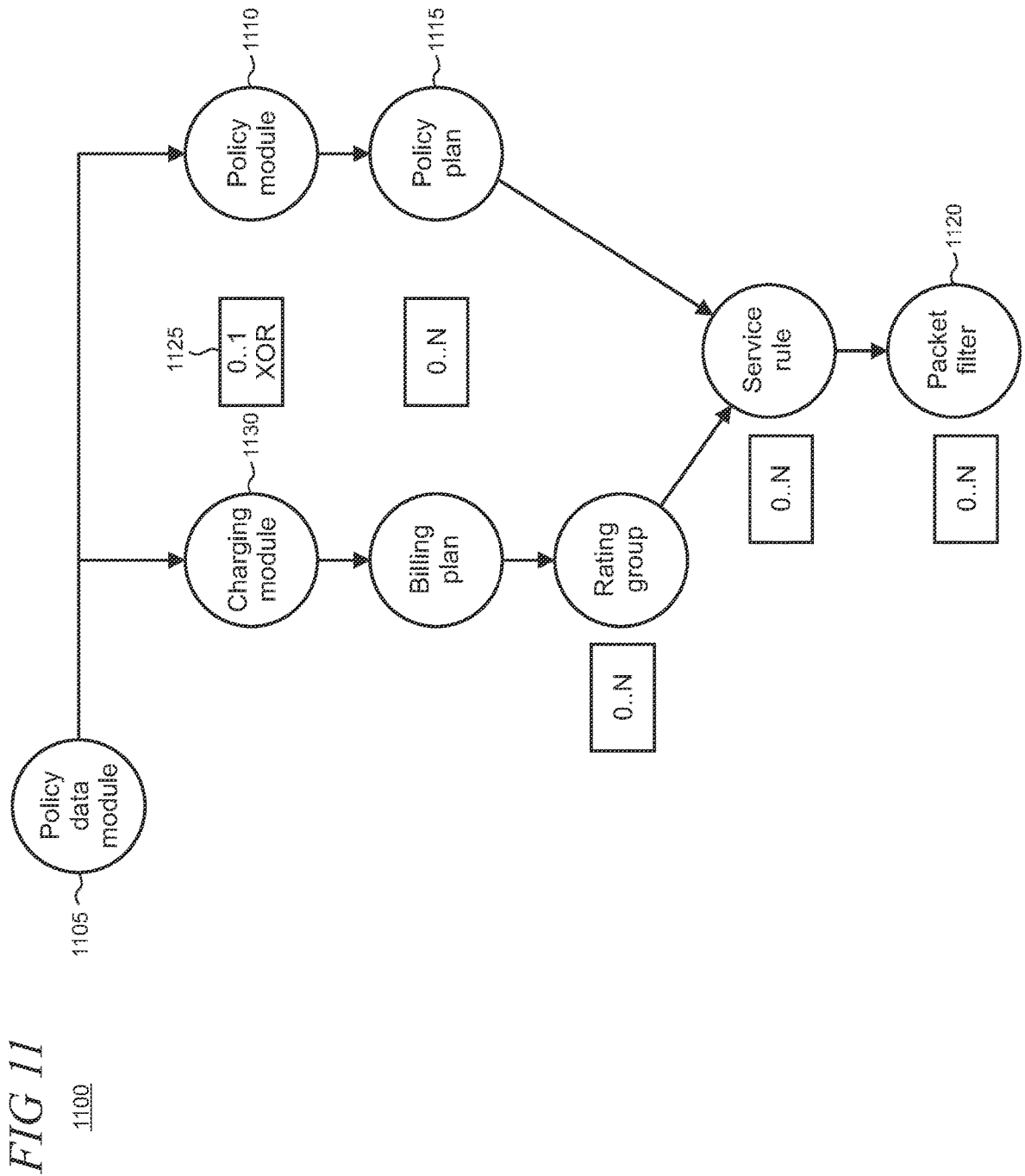
FIG. 11 shows an illustrative configuration database with which a dynamic match ordering methodology may be utilized to implement configuration conflict resolution.

FIG. 11 shows an illustrative configuration database with which a dynamic match ordering methodology may be utilized to implement configuration conflict resolution. The configuration database provides a set of configuration options that are expressed as nodes in a relationship graph that may comprise a tree structure 1100. Multiple types of configurations may be represented in the database tree including, for example, switch, tristate (i.e., multistate with and without levels), string (e.g., rule-name, filter-name), hexadecimal (e.g., passwords), and integer value (e.g., load-level).

As shown, a policy data module 1105 is at a root of the tree structure which may include parent and child configurations. As discussed above, a parent configuration comprises a predecessor of one or more other configurations. A child configuration is farther from the root node and is related to the parent configuration. For example, the policy module 1110 is a parent configuration and the policy plan 1115 is a child. A leaf configuration comprises a node on the tree structure that has no child configurations. In the illustrative configuration database tree structure 1100, the packet filter 1120 comprises a leaf configuration. A construct referred to as a "minor" may be utilized that comprises smaller input configurations that can be atomically applied because a parent/child configuration is already committed.

As indicated by reference numeral 1125, some configuration options in the graph may be exclusively disjunctive (XOR) such that only one can be present in a given configuration. In this illustrative example, either the charging module 1130 or the policy module 1110 can be present, but not both. The other configuration options in the graph do not have such an attribute.

Configuration conflict resolution may be performed by the automated configuration validation and testing system 115 (FIG. 1) using a relationship graph such as the illustrative tree structure 1100 using a methodology termed "dynamic match ordering." An exemplary dynamic match ordering method comprises 10 steps that may be executed in an automated manner on a suitable computing device that supports the automated system.

In step 1, a configuration database is expressed using a tree graph that shows relationships among input configurations that may be utilized in a VM or VM cluster. In step 2, each input configuration is divided into minors, i.e., smaller atomic configurations. In step 3, the minors are bucketed into categories. In step 4, a minor match order is skipped or reordered based on other minor(s) and their dependencies with a minor. A dynamic match order priority is assigned to each minor in step 5.

In step 6, a type of conflict is identified in each of the categories for a first minor. Conflict types may include, for example, equality, superset, erroneous superset, super equal, or partial overlap. The equality type comprises the same configuration but having different actions. Resolution of this type may be based on predefined parameters. The superset type comprises a configuration being utilized before another obsolete configuration without any issues. Processing by the eliminate module 320 (FIG. 3) may be utilized in this case.

The erroneous superset conflict type comprises a configuration being utilized before another obsolete configuration with expected issues. This may constitute a special case that requires user intervention. The super equal conflict type comprises the same configuration that performs the same actions. Processing by the eliminate module 320 (FIG. 3) may be utilized in this case.

The partial overlap conflict type comprises configurations that may partially overlap in some manner. Processing by the merge module 315 (FIG. 3) may be utilized in this case.

Turning back to the dynamic match ordering method, in step 7, once a minor is selected from the identified conflict type, the rejected configuration and all its child dependent configurations are discarded. Step 8 includes returning to step 4 and continuing until all the minors are processed. In step 9, the minors are joined to create a complete configuration for each of the categories with a commit order. In step 10, the categories are joined to create a full and complete configuration.

Execution of dynamic match ordering may give rise to special cases in some implementations of the automated configuration validation and testing system. For multistate configurations, conflicts within a multistate minor which may have a range of values based on severity (e.g., warning, minor, major, critical, etc.) may be resolved using upper bounds. In cases of integer equality, configuration differences may be handled using lower bounds, upper bounds, or averaging in which all child configurations are run through the dynamic match ordering method again. Integer types may include free-range averageable (i.e., 0-N) or fixed-range rigid (N1, N2, N3 . . . ). For free-range averageable, a conflict resolution process can use one or more of priority and timestamp, predefined lower or upper bound, or averaging. For fixed-value rigid, priority and timestamp may be utilized. For configurations that have overlapping ranges of values, conflicts can be resolved using maximum range values. In configurations that are arranged in list form, conflicts within list elements are not considered. In this situation, all the elements from all configurations are accepted.

It may be appreciated that the dynamic match ordering method may be implemented in a manner that allows for exceptions to be handled using manual intervention either prior to or during execution of the method. In cases in which manual intervention is utilized, updated configurations may be utilized to improve the operations of the automated configuration validation and testing system when operated in a fully automated manner.

Figure 12:
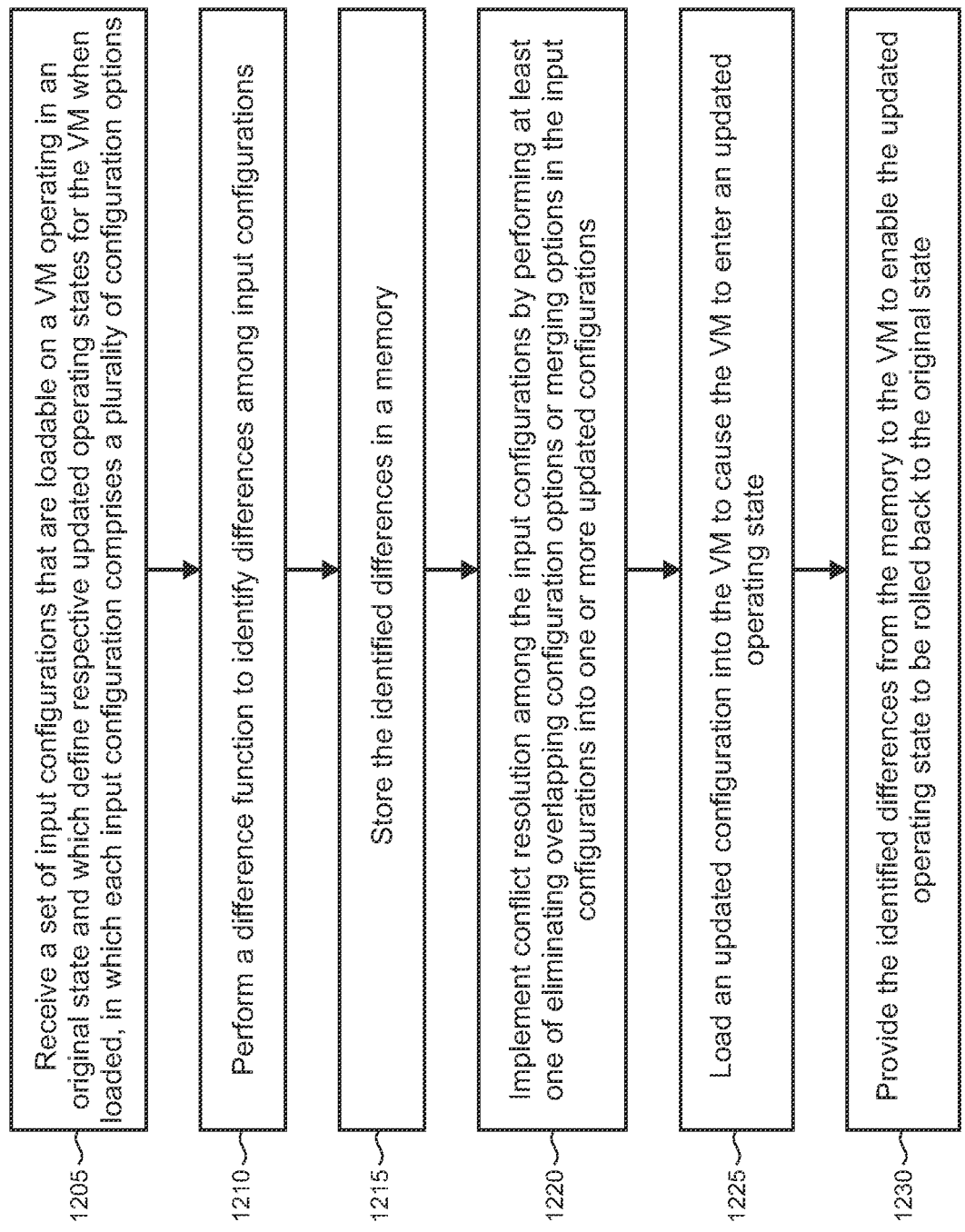
FIGS. 12, 13, and 14 show illustrative methods that may be performed when implementing the present automated configuration conflict resolution and lightweight restoration.

FIG. 12 is a flowchart of an illustrative method 1200 that may be performed by a computing device. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1205, a set of input configurations is received that are loadable on the VM operating in an original state and which define respective updated operating states for the VM when loaded, in which each input configuration comprises a plurality of configuration options.

At block 1210, a difference function is performed to identify differences among input configurations. At block 1215, the identified differences are stored in a memory. At block 1220, conflict resolution is implemented among the input configurations by performing at least one of eliminating overlapping configuration options or merging options in the input configurations into one or more updated configurations.

At block 1225, an updated configuration is loaded into the VM to cause the VM to enter an updated operating state. And, at block 1230, the identified differences are provided from the memory to the VM to enable the updated operating state to be rolled back to the original state.

Figure 13:
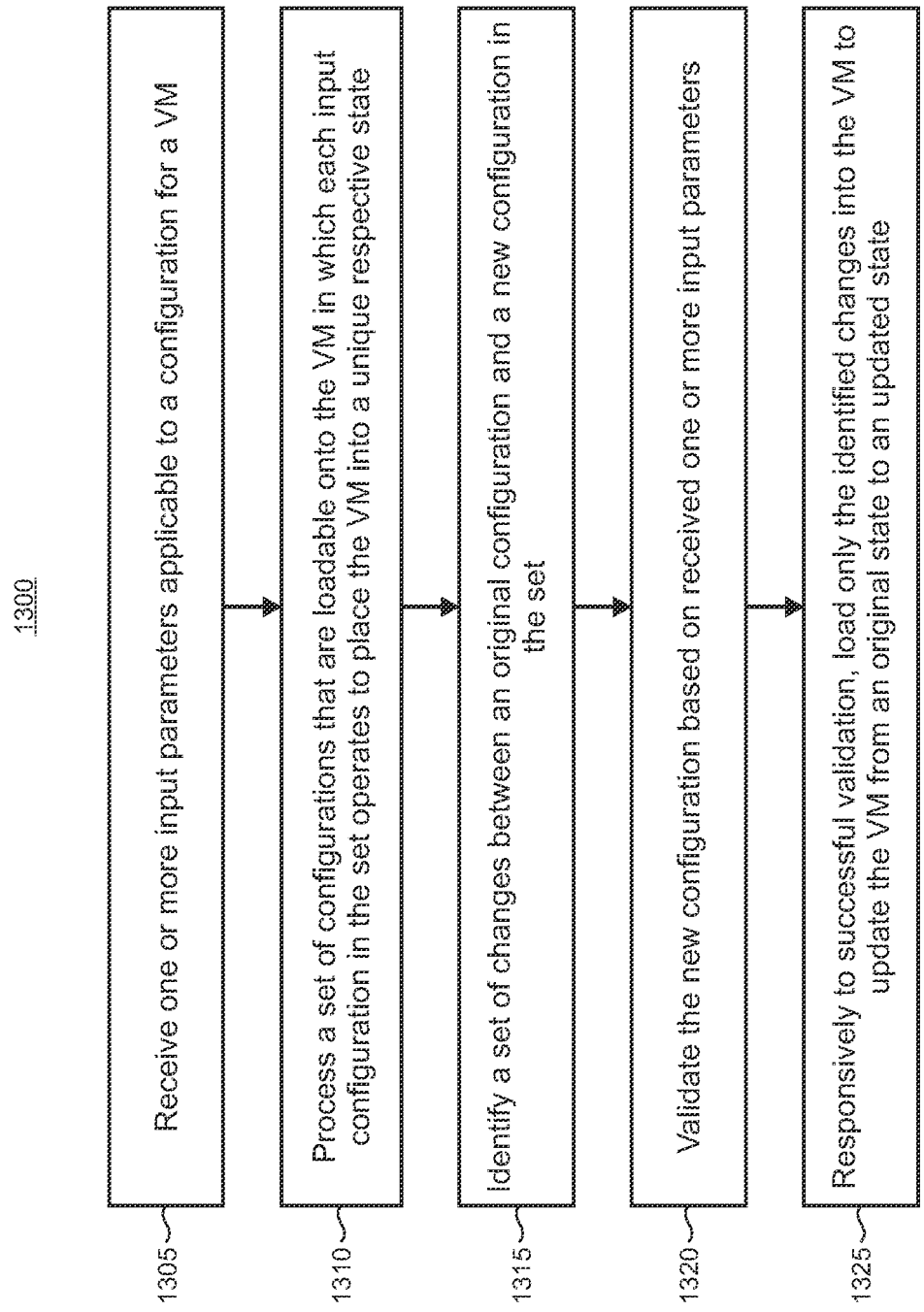

FIG. 13 is a flowchart of an illustrative method 1300 that may be performed by a computing device. At block 1305, one or more input parameters applicable to a configuration for a VM is received. At block 1310, a set of configurations that are loadable onto the VM are processed, in which each input configuration in the set operates to place the VM into a unique respective state. At block 1315, a set of changes between an original configuration and a new configuration in the set is identified. At block 1320, the new configuration is validated based on received one or more input parameters. And, at block 1325, responsively to successful validation, only the identified changes are loaded into the VM to update the VM from an original state to an updated state.

Figure 14:
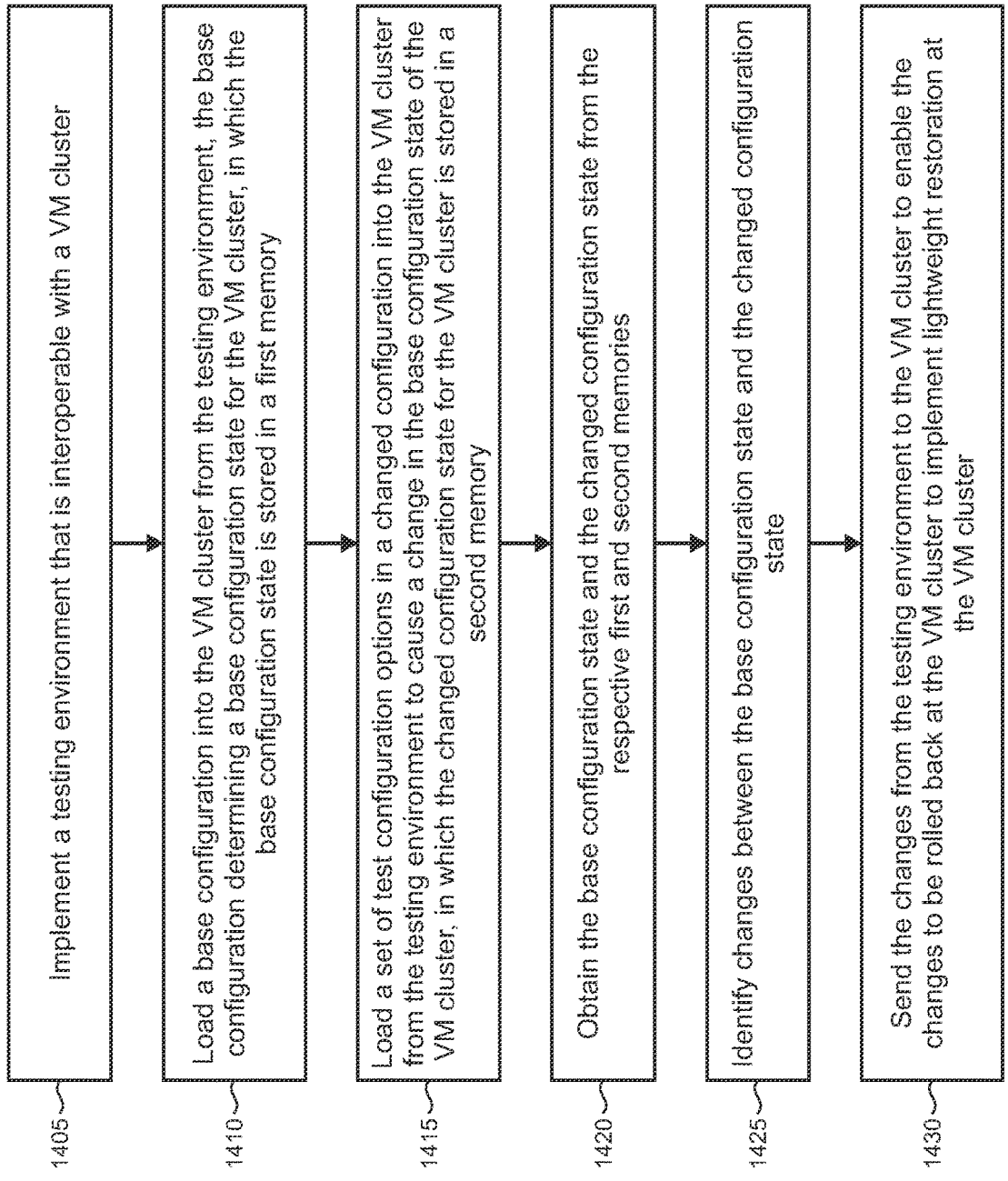

FIG. 14 is a flowchart of an illustrative method 1400 that may be performed by a computing device. At block 1405, a testing environment is implemented that is interoperable with a VM cluster. At block 1410, a base configuration is loaded into the VM cluster from the testing environment where the base configuration determines a base configuration state for the VM cluster, and in which the base configuration state is stored in a first memory. At block 1415, a set of test configuration options in a changed configuration is loaded into the VM cluster from the testing environment to cause a change in the base configuration state of the VM cluster, in which the changed configuration state for the VM cluster is stored in a second memory.

At block 1420, the base configuration state and the changed configuration state are obtained from the respective first and second memories. At block 1425, changes between the base configuration state and the changed configuration state are identified. And, at block 1430, the changes are sent from the testing environment to the VM cluster to enable the changes to be rolled back at the VM cluster to implement lightweight restoration at the VM cluster.

Figure 15:
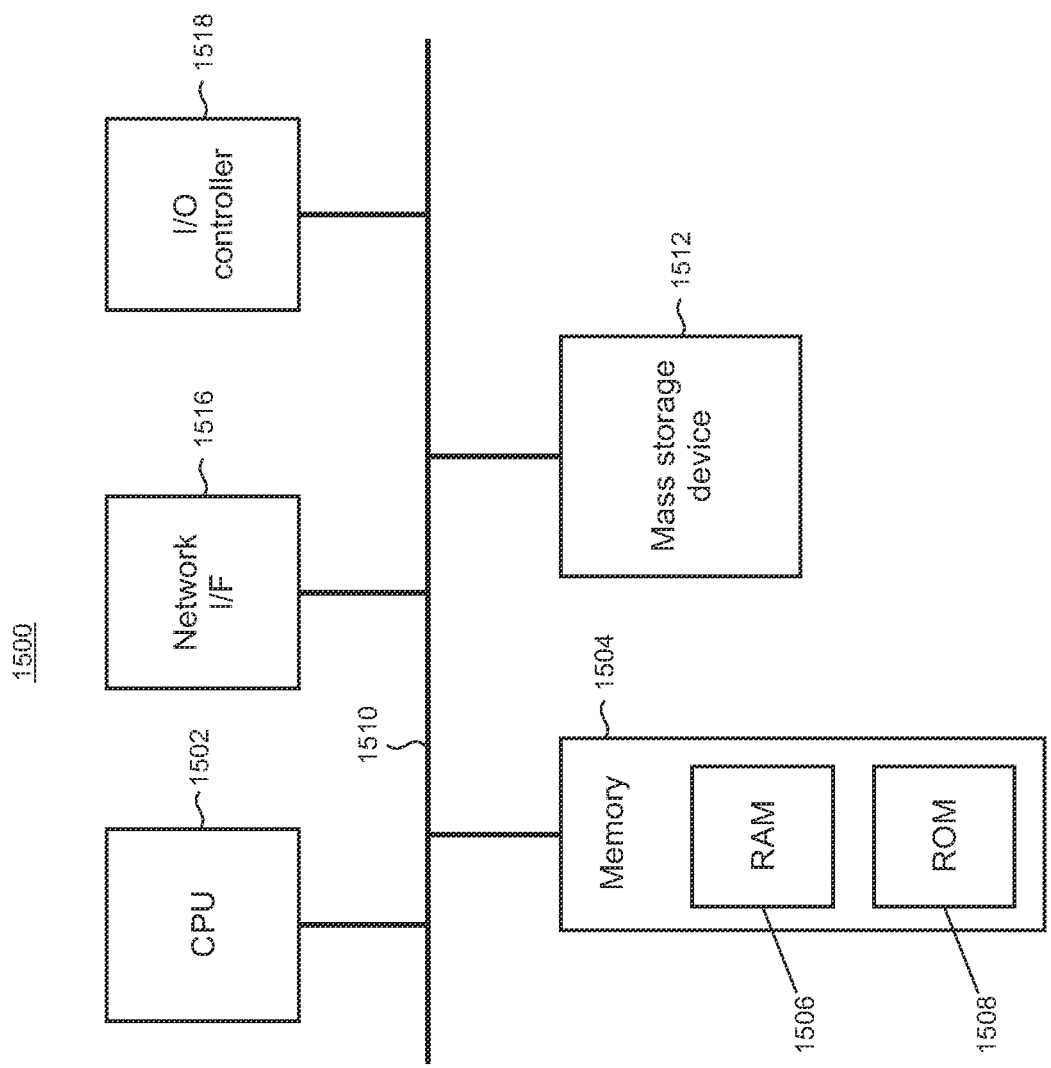
FIG. 15 is a block diagram of an illustrative computing device that may be used at least in part to implement the present automated configuration conflict resolution and lightweight restoration.

FIG. 15 shows an illustrative architecture 1500 for a device, such as a server, capable of executing the various components described herein for automated configuration conflict resolution and lightweight restoration. The architecture 1500 illustrated in FIG. 15 includes one or more processors 1502 (e.g., central processing unit, dedicated AI chip, graphic processing unit, etc.), a system memory 1504, including RAM (random access memory) 1506 and ROM (read only memory) 1508, and a system bus 1510 that operatively and functionally couples the components in the architecture 1500. A basic input/output system containing the basic routines that help to transfer information between elements within the architecture 1500, such as during startup, is typically stored in the ROM 1508. The architecture 1500 further includes a mass storage device 1512 for storing software code or other computer-executed code that is utilized to implement applications, the file system, and the operating system. The mass storage device 1512 is connected to the processor 1502 through a mass storage controller (not shown) connected to the bus 1510. The mass storage device 1512 and its associated computer-readable storage media provide non-volatile storage for the architecture 1500. Although the description of computer-readable storage media contained herein refers to a mass storage device, such as a hard disk or CD-ROM drive, it may be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that the software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like.

For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1500 in order to store and execute the software components presented herein. It also may be appreciated that the architecture 1500 may include other types of computing devices, including wearable devices, handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Figure 16:
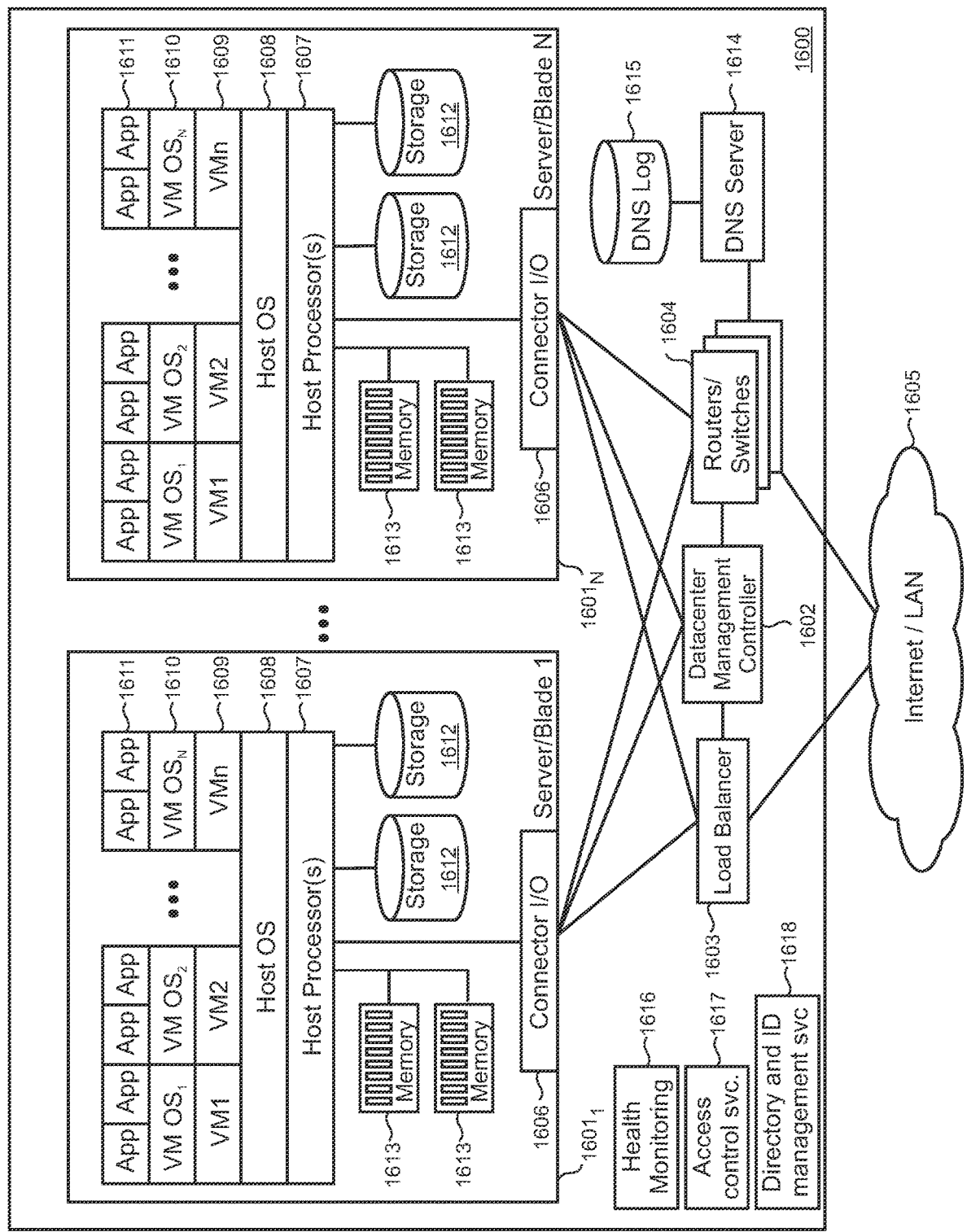
FIG. 16 is a block diagram of an illustrative datacenter that may be used at least in part to implement the present automated configuration conflict resolution and lightweight restoration.

FIG. 16 is a high-level block diagram of an illustrative datacenter 1600 that provides cloud computing services or distributed computing services that may be used to implement the present automated configuration conflict resolution and lightweight restoration. Datacenter 1600 may incorporate the features disclosed in FIGS. 1-11. A plurality of servers 1601 are managed by datacenter management controller 1602. Load balancer 1603 distributes requests and computing workloads over servers 1601 to avoid a situation wherein a single server may become overwhelmed. Load balancer 1603 maximizes available capacity and performance of the resources in datacenter 1600. Routers/switches 1604 support data traffic between servers 1601 and between datacenter 1600 and external resources and users (not shown) via an external network 1605, which may be, for example, a local area network (LAN) or the Internet.

Servers 1601 may be standalone computing devices, and/or they may be configured as individual blades in a rack of one or more server devices. Servers 1601 have an input/output (I/O) connector 1606 that manages communication with other database entities. One or more host processors 1607 on each server 1601 run a host operating system (OS) 1608 that supports multiple virtual machines (VM) 1609. Each VM 1609 may run its own OS so that each VM OS 1610 on a server is different, or the same, or a mix of both. The VM OSs 1610 may be, for example, different versions of the same OS (e.g., different VMs running different current and legacy versions of the Windows® operating system). In addition, or alternatively, the VM OSs 1610 may be provided by different manufacturers (e.g., some VMs running the Windows® operating system, while other VMs are running the Linux® operating system). Each VM 1609 may also run one or more applications (App) 1611. Each server 1601 also includes storage 1612 (e.g., hard disk drives (HDD)) and memory 1613 (e.g., RAM) that can be accessed and used by the host processors 1607 and VMs 1609 for storing software code, data, etc. In one embodiment, a VM 1609 may employ the data plane APIs as disclosed herein.

Datacenter 1600 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1600 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1609 on server 16011 to run their applications 1611. When demand for an application 1611 increases, the datacenter 1600 may activate additional VMs 1609 on the same server 16011 and/or on a new server 1601N as needed. These additional VMs 1609 can be deactivated if demand for the application later drops.

Datacenter 1600 may offer guaranteed availability, disaster recovery, and back-up services. For example, the datacenter may designate one VM 1609 on server 16011 as the primary location for the tenant's application and may activate a second VM 1609 on the same or a different server as a standby or back-up in case the first VM or server 16011 fails. Database manager 1602 automatically shifts incoming user requests from the primary VM to the back-up VM without requiring tenant intervention. Although datacenter 1600 is illustrated as a single location, it will be understood that servers 1601 may be distributed to multiple locations across the globe to provide additional redundancy and disaster recovery capabilities. Additionally, datacenter 1600 may be an on-premises, private system that provides services to a single enterprise user or may be a publicly accessible, distributed system that provides services to multiple, unrelated customers and tenants or may be a combination of both.

Domain Name System (DNS) server 1614 resolves domain and host names into IP addresses for all roles, applications, and services in datacenter 1600. DNS log 1615 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 1616 monitors the health of the physical systems, software, and environment in datacenter 1600. Health monitoring 1616 provides feedback to datacenter managers when problems are detected with servers, blades, processors, or applications in datacenter 1600 or when network bandwidth or communications issues arise.

Access control service 1617 determines whether users are allowed to access particular connections and services on cloud service 1600. Directory and identity management service 1618 authenticates user credentials for tenants on datacenter 1600.

Figure 17:
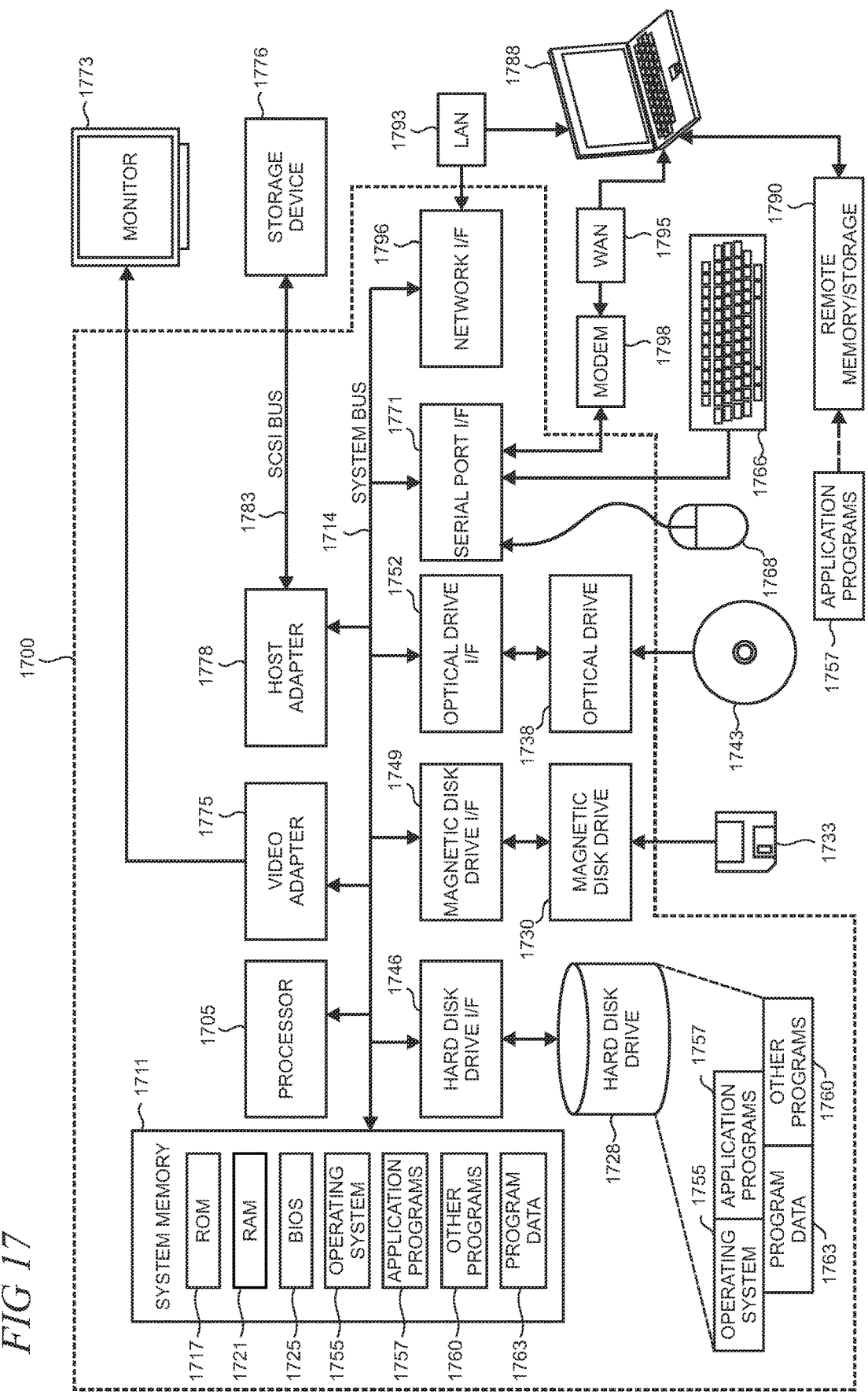
FIG. 17 is a simplified block diagram of an illustrative computer system that may be used at least in part to implement the present automated configuration conflict resolution and lightweight restoration.

FIG. 17 is a simplified block diagram of an illustrative computer system 1700 such as a PC, client machine, or server with which the present automated configuration conflict resolution and lightweight restoration may be implemented. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present automated configuration conflict resolution and lightweight restoration. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1733, optical disk 1743, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, personal computers typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as another personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present automated configuration conflict resolution and lightweight restoration.

Various exemplary embodiments of the present automated configuration conflict resolution and lightweight restoration are now presented by way of illustration and not as an exhaustive list of all embodiments. An example includes a computing device configured as a configuration validation and testing system, comprising: one or more processors; an interface arranged for interoperations with at least one virtual machine (VM); and at least one non-transitory computer-readable memory having computer-executable instructions stored thereon which, when executed by the one or more processors, cause the computing device to: receive a set of input configurations that are loadable on the VM operating in an original state and which define respective updated operating states for the VM when loaded, in which each input configuration comprises a plurality of configuration options; perform a difference function to identify differences among input configurations; store the identified differences in the memory; implement conflict resolution among the input configurations by performing at least one of eliminating overlapping configuration options or merging options in the input configurations into one or more updated configurations; load an updated configuration into the VM to cause the VM to enter an updated operating state; and provide the identified differences from the memory to the VM to enable the updated operating state to be rolled back to the original state.

In another example, the executed instructions further cause the computing device to validate the input configurations for correctness. In another example, the validating comprises sending a call to the VM for sending or receiving network traffic to test correctness of the updated configuration. In another example, the executed instructions further cause the computing device to receive inputs from one of internal or external systems and utilize the inputs for performing one or more of validation or conflict resolution. In another example, the inputs comprise one of timestamp, priority, or specification. In another example, an updated configuration is determined using dynamic match ordering of atomic configurations that are represented on a relationship graph. In another example, the computing device further includes a user interface adapted for one of enabling manual intervention in operations of the configuration validation and testing system, raising alerts, or providing notifications.

A further example includes a method for managing configurations for a virtual machine (VM), comprising: receiving one or more input parameters applicable to a configuration for the VM; processing a set of configurations that are loadable onto the VM in which each input configuration in the set operates to place the VM into a unique respective state; identifying a set of changes between an original configuration and a new configuration in the set; validating the new configuration based on received one or more input parameters; and responsively to successful validation, loading only the identified changes into the VM to update the VM from an original state to an updated state.

In another example, the method further comprises rolling back the identified changes at the VM to restore the VM back to the original state from the updated state. In another example, the VM supports multiple different configurations and further including performing conflict resolution for the different configurations. In another example, the conflict resolution is implemented in a series of automated actions performed by one of configuration validation module, traffic validation module, load and restore module, merge module, or eliminate module, each of which are instantiated in a validation and testing system that is operable on a computing device. In another example, a configuration is represented by a graph in which graph edges indicate dependencies and nodes indicate configuration options. In another example, a configuration is validated by sending traffic to a device under test (DUT). In another example, the method is performed in a test suite environment.

A further example includes one or more non-transitory computer-readable memory devices storing computer-executable instructions which, upon execution by one or more processors disposed in a computing device, cause the computing device to: implement a testing environment that is interoperable with a virtual machine (VM) cluster; load a base configuration into the VM cluster from the testing environment, the base configuration determining a base configuration state for the VM cluster, in which the base configuration state is stored in a first memory; load a set of test configuration options in a changed configuration into the VM cluster from the testing environment to cause a change in the base configuration state of the VM cluster, in which the changed configuration state for the VM cluster is stored in a second memory; obtain the base configuration state and the changed configuration state from the respective first and second memories; identify changes between the base configuration state and the changed configuration state; and send the changes from the testing environment to the VM cluster to enable the changes to be rolled back at the VM cluster to implement lightweight restoration at the VM cluster.

In another example, the instructions further cause the computing device to perform conflict resolution between the base configuration and changed configuration. In another example, the instructions further cause the computing device to load a second set of test configuration options in a second changed configuration into the VM cluster from the testing environment. In another example, the instructions further cause the computing device to obtain the base configuration state and a second changed configuration state from the respective first and second memories, identify changes between the base configuration state and the second configuration state, and send the changes to the VM cluster. In another example, the instructions further cause the computing device to iterate the steps of loading test configuration options for additional changed configurations, identifying changes between the base configuration state and additional changed configuration states, and sending the changes to the VM cluster. In another example, the lightweight restoration is implemented without rebooting one or more VMs in the VM cluster.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device configured as a configuration validation and testing system, comprising:
   one or more processors;
   an interface arranged for interoperations with at least one virtual machine (VM); and
   at least one non-transitory computer-readable memory having computer-executable instructions stored thereon which, when executed by the one or more processors, cause the computing device to:
   receive a set of input configurations that are loadable on the VM operating in an original state and which define respective updated operating states for the VM when loaded, in which each input configuration comprises a plurality of configuration options;
   perform a difference function to identify differences among input configurations;
   store the identified differences in the memory;
   implement conflict resolution among the input configurations by performing at least one of eliminating overlapping configuration options or merging options in the input configurations into one or more updated configurations in which an updated configuration is determined using dynamic match ordering of atomic configurations that are represented on a relationship graph;
   load an updated configuration into the VM to cause the VM to enter an updated operating state; and
   provide the identified differences from the memory to the VM to enable the updated operating state to be rolled back to the original state.

2. The computing device of claim 1 in which the executed instructions further cause the computing device to validate the input configurations for correctness.

3. The computing device of claim 2 in which the validating comprises sending a call to the VM for sending or receiving network traffic to test correctness of the updated configuration.

4. The computing device of claim 2 in which the executed instructions further cause the computing device to receive inputs from one of internal or external systems and utilize the inputs for performing one or more of validation or conflict resolution.

5. The computing device of claim 4 in which the inputs comprise one of timestamp, priority, or specification.

6. The computing device of claim 1 further including a user interface adapted for one of enabling manual intervention in operations of the configuration validation and testing system, raising alerts, or providing notifications.

7. A method for managing configurations for a virtual machine (VM), comprising:
receiving one or more input parameters applicable to a configuration for the VM in which the configuration is represented by a graph in which graph edges indicate dependencies and nodes indicate configuration options;
processing a set of configurations that are loadable onto the VM in which each input configuration in the set operates to place the VM into a unique respective state;
identifying a set of changes between an original configuration and a new configuration in the set;
validating the new configuration based on received one or more input parameters; and
responsively to successful validation, loading only the identified changes into the VM to update the VM from an original state to an updated state.

8. The method of claim 7 further comprising rolling back the identified changes at the VM to restore the VM back to the original state from the updated state.

9. The method of claim 7 which the VM supports multiple different configurations and further including performing conflict resolution for the different configurations.

10. The method of claim 9 in which the conflict resolution is implemented in a series of automated actions performed by one of configuration validation module, traffic validation module, load and restore module, merge module, or eliminate module, each of which are instantiated in a validation and testing system that is operable on a computing device.

11. The method of claim 7 in which a configuration is validated by sending traffic to a device under test (DUT).

12. The method of claim 11 as performed in a test suite environment.

13. One or more non-transitory computer-readable memory devices storing computer-executable instructions which, upon execution by one or more processors disposed in a computing device, cause the computing device to:
implement a testing environment that is interoperable with a virtual machine (VM) cluster;
load a base configuration into the VM cluster from the testing environment, the base configuration determining a base configuration state for the VM cluster, in which the base configuration state is stored in a first memory;
load a set of test configuration options in a changed configuration into the VM cluster from the testing environment to cause a change in the base configuration state of the VM cluster, in which the changed configuration state for the VM cluster is stored in a second memory, and in which base configuration state and changed configuration state are each represented by a graph in which graph edges indicate dependencies and nodes indicate the configuration options;
obtain the base configuration state and the changed configuration state from the respective first and second memories;
identify changes between the base configuration state and the changed configuration state; and
send the changes from the testing environment to the VM cluster to enable the changes to be rolled back at the VM cluster to implement lightweight restoration at the VM cluster.

14. The one or more non-transitory computer-readable memory devices of claim 13 which the instructions further cause the computing device to perform conflict resolution between the base configuration and changed configuration.

15. The one or more non-transitory computer-readable memory devices of claim 13 which the instructions further cause the computing device to load a second set of test configuration options in a second changed configuration into the VM cluster from the testing environment.

16. The one or more non-transitory computer-readable memory devices of claim 15 in which the instructions further cause the computing device to obtain the base configuration state and a second changed configuration state from the respective first and second memories, identify changes between the base configuration state and the second configuration state, and send the changes to the VM cluster.

17. The one or more non-transitory computer-readable memory devices of claim 13 which the instructions further cause the computing device to iterate the steps of loading test configuration options for additional changed configurations, identifying changes between the base configuration state and additional changed configuration states, and sending the changes to the VM cluster.

18. The one or more non-transitory computer-readable memory devices of claim 13 in which the lightweight restoration is implemented without rebooting one or more VMs in the VM cluster.

* * * * *